United States Patent
Bradford et al.

(10) Patent No.: US 12,528,578 B2
(45) Date of Patent: Jan. 20, 2026

(54) FOUR-BAR FLAPPING ROTORS FOR AIRCRAFT AND ASSOCIATED METHODS

(71) Applicant: The Boeing Company, Arlington, VA (US)

(72) Inventors: Mark Jerome Bradford, Chalfont, PA (US); Brian Patrick Garrett, Media, PA (US); Tejaswi Peri, Newtown Square, PA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/589,295

(22) Filed: Feb. 27, 2024

(65) Prior Publication Data
US 2025/0269952 A1   Aug. 28, 2025

(51) Int. Cl.
*B64C 27/41* (2006.01)
*B64C 27/39* (2006.01)

(52) U.S. Cl.
CPC .............. *B64C 27/41* (2013.01); *B64C 27/39* (2013.01)

(58) Field of Classification Search
CPC .......... B64C 27/37; B64C 27/39; B64C 27/41
See application file for complete search history.

(56) References Cited

U.S. PATENT DOCUMENTS

| | | | | |
|---|---|---|---|---|
| 4,681,511 | A  * | 7/1987 | Glatfelter | B64C 27/37 416/140 |
| 9,388,862 | B2 * | 7/2016 | Lidak | F16D 3/30 |
| 2014/0302938 | A1 * | 10/2014 | Lidak | B64C 27/41 464/125 |

* cited by examiner

*Primary Examiner* — Juan G Flores
(74) *Attorney, Agent, or Firm* — Hanley, Flight & Zimmerman, LLC

(57) ABSTRACT

Four-bar flapping rotors for aircraft and associated methods are disclosed. An example a flapping rotor hub described herein includes a rotor hub having a first end and a second end, the first end opposite the second end along an axis of rotation of the rotor hub, a first link rotatably coupled to the rotor hub at the first end, the first link to rotate in a plane parallel to the axis of rotation, a second link rotatably coupled to the rotor hub at the second end, the second link to rotate in the plane, and a pitch housing rotatably coupled to the first link at a third end of the pitch housing, the pitch housing rotatably coupled to the second link at a fourth end of the pitch housing, the pitch housing to rotate and translate in the plane, the pitch housing to receive a rotor blade.

20 Claims, 8 Drawing Sheets

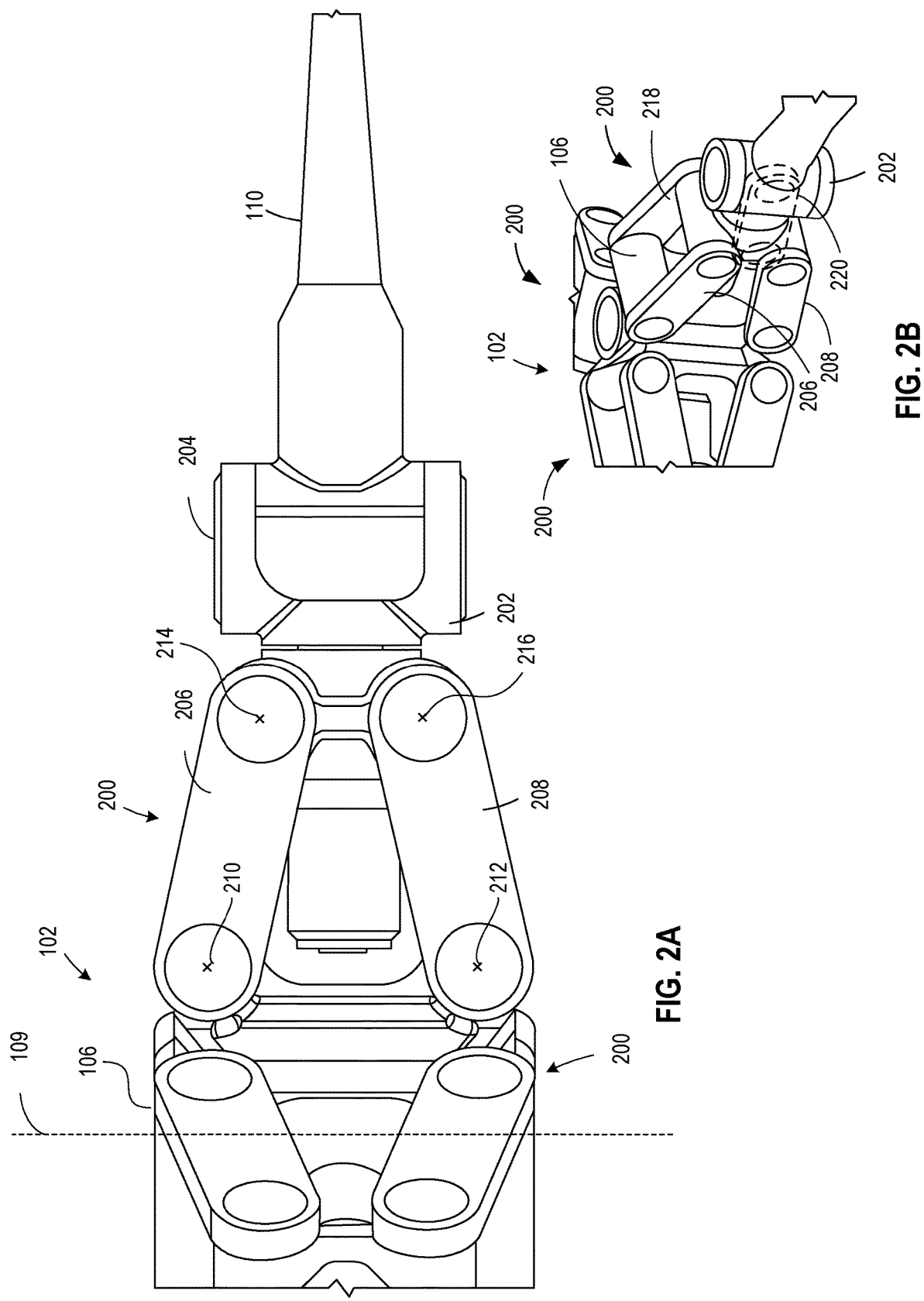

FOUR-BAR FLAPPING ROTORS FOR AIRCRAFT AND ASSOCIATED METHODS

FIELD

This disclosure relates generally to aircraft and, more particularly, to four-bar flapping rotors for aircraft and associated methods.

BACKGROUND

In recent years, helicopters and other rotorcraft utilize rotor designs that are rigid, semi-rigid, and fully articulated. Rigid rotors rigidly couple the rotor blades to the hub. As such, the various forces and moments that occur during operation of the helicopter are transferred directly from the rotor blades to the hub. Semi-rigid rotors rigidly couple the rotor blades to the hub but add a hinge to the hub to allow for free movement of the rotor blades in a flapping or seesaw direction. In this way, the stresses on the hub and rotor blades are reduced as the rotor blades are allowed to move in response to the forces and moments that occur during operation of the helicopter. Fully articulated rotors couple the rotor blades to the hubs using a series of hinges that allow for the rotor blades to move freely in the flapping direction and the lead-lag direction. As such, the rotor blades of fully articulated rotors nearly eliminate moments transferred to the hub in response to operation of the helicopter.

SUMMARY

An example a flapping rotor hub described herein includes a rotor hub having a first end and a second end, the first end opposite the second end along an axis of rotation of the rotor hub, a first link rotatably coupled to the rotor hub at the first end, the first link to rotate in a plane parallel to the axis of rotation, a second link rotatably coupled to the rotor hub at the second end, the second link to rotate in the plane, and a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade.

An example rotorcraft described herein includes a mast having an axis of rotation, a hub coupled to the mast, a rotor blade coupled to the hub and substantially perpendicular to the axis of rotation, and a four-bar linkage coupled to the hub and the rotor blade. The four-bar linkage includes a ground link fixedly coupled to the hub, the ground link having a first end spaced from a second end, the first end and the second end to form a line parallel to the axis of rotation, a first link rotatably coupled to the ground link at the first end, the first link to rotate in a plane parallel to the axis of rotation, a second link rotatably coupled to the ground link at the second end, the second link to rotate in the plane. The rotorcraft further includes a pitch housing having a third end spaced from a fourth end, the pitch housing rotatably coupled to the first link at the third end, the pitch housing rotatably coupled to the second link at the fourth end, the pitch housing to move along the plane, the pitch housing coupled to the rotor blade.

An example method of forming a flapping rotor is described herein. The method includes coupling a rotor blade to a pitch housing, rotatably coupling the pitch housing to a first link and a second link, the first link coupled to the pitch housing spaced apart from the second link a first distance, rotatably coupling the first link and the second link to a rotor hub, the first link coupled to the rotor hub spaced apart from the second link a second distance, and defining a ratio of the first distance and the second distance, the ratio corresponding to an agility the rotor provides to a rotorcraft.

The features, functions, and advantages of that have been discussed can be achieved independently in various embodiments or may be combined in yet other embodiments further details of which can be seen with reference to the following description and drawings.

BRIEF DESCRIPTION OF THE DRAWINGS

FIGS. 2A and 2B illustrate an example rotor hub of the four-bar flapping rotor of FIG. 1 with an example four-bar linkage.

In general, the same reference numbers will be used throughout the drawing(s) and accompanying written description to refer to the same or like parts. The figures are not necessarily to scale.

DETAILED DESCRIPTION

Figure 1:
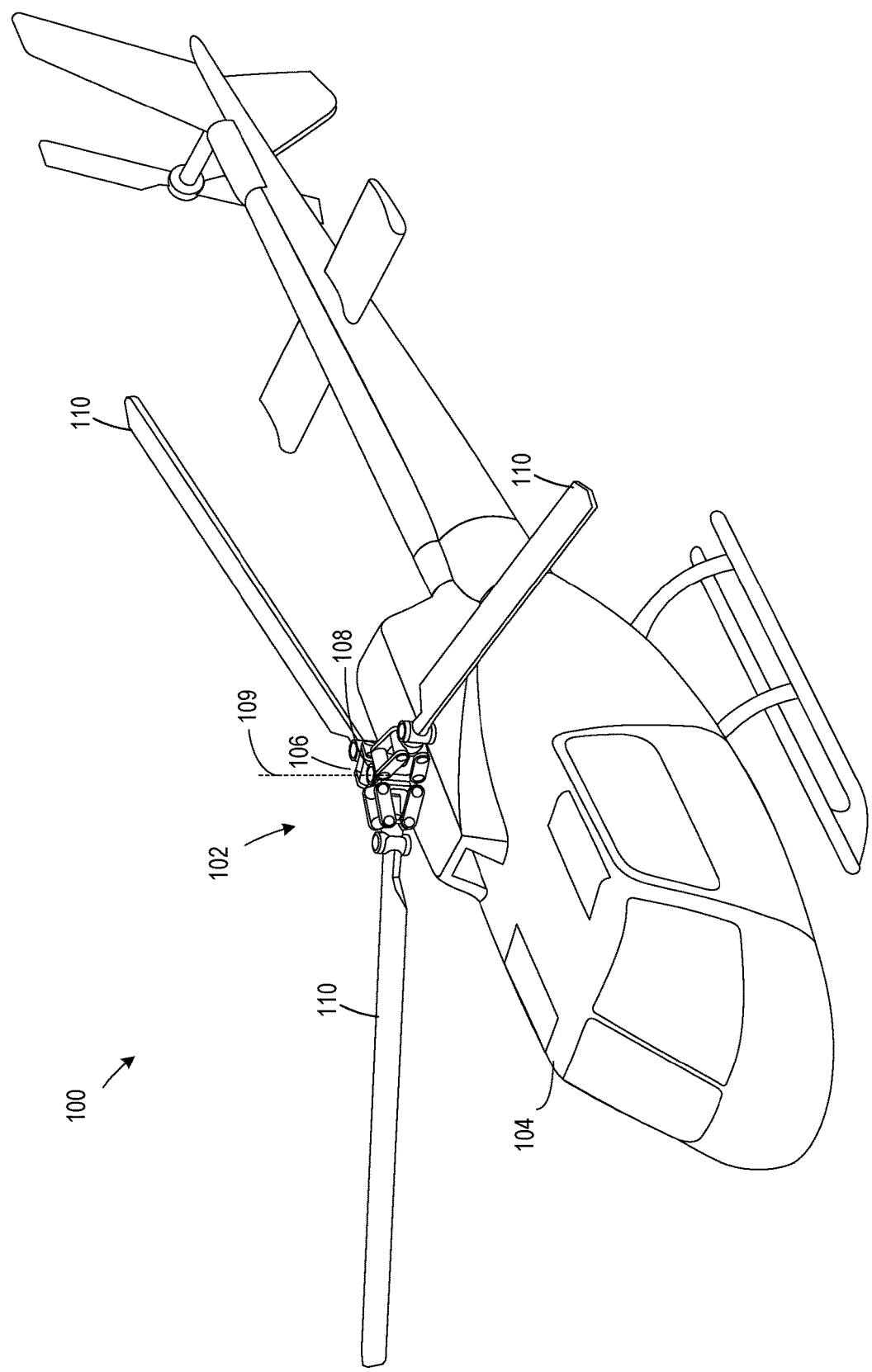
FIG. 1 is an example rotorcraft on which an example four-bar flapping rotor can be implemented.

Rotor design balances the weight of the rotor with the response of the rotor to control commands. Known rigid rotors provide a rapid response to maneuvering controls as all reaction forces and moments from the rotor blades are transferred directly to the hub and consequently to the rotorcraft. However, known rigid rotors require a large, heavy hub and commensurately large and heavy support hardware to withstand the forces and moments. The extra weight of the system using known rigid rotors increases fuel consumption and lowers the overall payload capacity. Alternatively, known fully articulated rotors allow a rotor blade to rotate freely, which greatly reduces the moments transferred to the hub as reaction forces instead cause the blade to flap or otherwise rotate relative to the hub. As such, response times to maneuvering controls are longer as roll and pitch moments introduced into the rotorcraft are reduced. A known fully articulated rotor can utilize a smaller hub and supporting hardware, which results in weight reduction. In many rotorcraft, a known fully articulated rotor design is used when payload capacity is prioritized, and control response rate is less important.

Known fully articulated rotors have issues with vibrations caused by lead-lag rotation of rotor blades. When a rotor blade is pitched or otherwise subjected to control inputs, the change in lift forces on the rotor blade cause the rotor blade to flap (e.g., rotate in the flap direction). The rotor blade rotates around a flapping hinge which, in turn, causes the center of gravity of the rotor blade to rotate. As the center of gravity of the rotor blade rotates around the flapping hinge, the center of gravity moves closer or further from the axis of rotation of the hub. Conservation of rotational inertia causes the rotational speed of the rotor blade to increase as the center of gravity approaches the axis of rotation and decrease as the center of gravity moves away from the axis of rotation. Thus, the changing rotational speed of the rotor blade causes a cyclic rotation in the lead-lag direction which, in turn, causes lead lag vibration. Known fully articulated rotors incorporate a damper to control lead-lag vibrations.

Example rotors described herein limit the lead lag vibration by utilizing four-bar linkages to enable a flapping motion of the rotor blades. Example four-bar linkages described herein allow the center of gravity of the rotor to move in a substantially axial direction relative to the axis of rotation of the rotor. Additionally, example four-bar linkages described herein can be designed to define an instantaneous center of rotation for the rotor blade (e.g., a point about which the center of gravity rotates) as it rotates in the flap-wise direction. Thus, the instantaneous center of rotation for the rotor blade can be shifted away from the four-bar linkage and towards the center of gravity. This effectively reduces a radius of rotation for the center of gravity, resulting in a smaller movement of the center of gravity for a given angular deflection and less consequent lead-lag vibration. Example rotors described herein limit lead-lag vibrations, and therefore require smaller and lighter dampers than known rotors.

FIG. 1 is an example rotorcraft 100 on which an example four-bar flapping rotor 102 can be implemented. The rotorcraft 100 is depicted as a single rotor helicopter, but in other examples the rotorcraft 100 can be any other kind of aircraft with a rotor (e.g., tandem rotor helicopter, tiltrotor aircraft, etc.). The rotor 102 is coupled to the rotorcraft 100 at an example location of an example fuselage 104. In other examples, the rotor 102 can be coupled to a different location. In some examples, multiple rotors 102 are coupled to the rotorcraft 100 at different positions on the fuselage 104. The rotor 102 includes an example rotor hub 106, discussed in further detail in reference to FIGS. 2A-2B, coupled to an example mast 108. The mast 108 couples to an example engine to rotate the rotor 102 about an example axis of rotation 109. Example rotor blades 110 couple to the rotor hub 106. FIG. 1 shows the rotor 102 with three rotor blades 110 coupled to the rotor hub 106. In other examples, the rotor 102 can have a different number of rotor blades 110 (e.g., two rotor blades, four rotor blades, etc.).

FIGS. 2A and 2B illustrate an example rotor hub 106 of the four-bar flapping rotor 102 of FIG. 1 with an example four-bar linkage 200. FIG. 2A is a side view of the example rotor hub 106 and the four-bar linkage 200. For clarity, a number of known components (e.g., a lead-lag damper, swash plate, pitch control rods, etc.) have been removed from the depiction of the rotor 102. However, it should be understood that such components can be present in any embodiment of the rotor 102. The rotor 102 includes a four-bar linkage 200 for each rotor blade 110, as discussed below in relation to FIG. 2B. The four-bar linkage 200 couples an example pitch housing 202 to the rotor hub 106. The rotor blade 110 is coupled to the pitch housing 202, opposite the four-bar linkage 200. The four-bar linkage 200 enables flap-wise rotation (e.g., rotation within a plane that includes the axis of rotation 109 of the rotor 102) of the rotor blade 110. An example lead-lag hinge 204 (e.g., vertical hinge, drag hinge, etc.) located in the pitch housing 202 enables lead-lag rotation (e.g., rotation within a plane that is substantially perpendicular to the axis of rotation 109 of the rotor 102) of the rotor blade 110. The pitch housing 202 rotates to allow a pitch (e.g., angle of attack) of the rotor blade 110 to change in response to control commands. In this way, the rotor 102 enables all the rotor blade motions of a known fully articulated rotor.

The four-bar linkage 200 of FIG. 2A includes an example first link 206 (e.g., first link bar, upper link, etc.) and an example second link 208 (e.g., second link bar, lower link, etc.). The first link 206 and second link 208 have an example geometry (e.g., size, shape, length, profile, etc.). Other example links 206, 208 can have different geometries. FIG. 2A illustrates the first link 206 and the second link 208 as having similar lengths (e.g., geometries). In other examples, the first link 206 can be longer or shorter than the second link 208. In some examples, the first link 206, the second link 208, the pitch housing 202, and the rotor blade 110 form an assembly (e.g., a blade assembly) to easily mount to the rotor hub 106. Multiple assemblies can be prepared and coupled to the rotor hub 106 such that each assembly is identical and radially symmetrically positioned about the axis of rotation 109.

The first link 206 is rotationally coupled to the rotor hub 106 at an example first point 210. The second link 208 is rotationally coupled to the rotor hub 106 at an example second point 212. In this way, the rotor hub 106 forms a link (e.g., a ground link) of the four-bar linkage 200 with a length (e.g., a hub spacing) equal to a distance between the first point 210 and the second point 212. In some examples, the first point 210 and the second point 212 are on a ground link, and the ground link is fixedly coupled to the rotor hub 106. FIG. 2A illustrates an example distance between (e.g., spacing of) the first point 210 and the second point 212. In other examples, the first point 210 and the second point 212 can be spaced apart at a different distance (e.g., longer or shorter). The first point 210 is located on or near a top side (e.g., a top end, an upper end, a higher point of, etc.) of the rotor hub 106. The second point 212 is located on or near a bottom side (e.g., a bottom end, a lower end, a lower point of, etc.) of the rotor hub 106. The first point 210 and the second point 212 are equidistant to the axis of rotation 109. In other examples, the first point 210 and the second point 212 can have different positions relative to the rotor hub 106 and/or the axis of rotation 109 (e.g., not equidistant to the axis of rotation 109).

The first link 206 is rotationally coupled to the pitch housing 202 at an example third point 214. The second link 208 is rotationally coupled to the pitch housing 202 at an example fourth point 216. In this way, the pitch housing 202 forms a link (e.g., a coupler link) of the four-bar linkage 200 with a length (e.g., pitch housing spacing) equal to a distance between the third point 214 and the fourth point 216. FIG. 2A illustrates an example distance between (e.g., spacing of) the third point 214 and the fourth point 216. In other examples, the third point 214 and the fourth point 216 can be spaced apart at a different distance (e.g., longer or shorter). The third point 214 is located on or near a top side (e.g., a top end, an upper end, a higher point of, etc.) of the pitch housing 202, opposite from the rotor blade 110 relative to the lead-lag hinge 204. The fourth point 216 is located on or near a bottom side (e.g., a bottom end, a lower end, a lower point of, etc.) of the pitch housing 202, opposite from the rotor blade 110 relative to the lead-lag hinge 204. The third point 214 and the fourth point 216 are equidistant to the lead-lag hinge 204. In other examples, the third point 214 and the fourth point 216 can have different positions relative to the pitch housing 202 and/or the lead-lag hinge 204 (e.g., not equidistant to the lead-lag hinge 204).

FIG. 2B is a perspective view of the rotor 102 showing the four-bar linkage 200 and four-bar linkages 200 that connect to the example rotor blades 110 (as shown in FIG. 1). FIG. 2B illustrates an example four-bar linkage 200 that includes an example third link 218 and an example fourth link 220 (shown hidden behind the pitch housing 202) parallel to the first link 206 and the second link 208. The third link 218 and fourth link 220 are rotationally coupled to an opposite side of the rotor hub 106 and the pitch housing 202. The third link 218 shares a first axis of rotation (e.g., an axis including the first point 210) and a second axis of rotation (e.g., an axis including the third point 214) with the first link 206. The fourth link 220 shares a third axis of rotation (e.g., an axis including the second point 212) and a fourth axis of rotation (e.g., an axis including the fourth point 216) with the second link 208. In this way, the first link 206, the second link 208, the third link 218, and the fourth link 220 share the loads generated by the rotor blade 110 while maintaining the motion defined by the four-bar linkage.

Returning to FIG. 2A, the first point 210, the second point 212, the third point 214, and the fourth point 216 define the kinematics of the four-bar linkage 200. In other words, the motion of the four-bar linkage 200 and resulting range of motion of the rotor blade 110 depend on the distance between the first point 210 and the second point 212 (e.g., a length of the ground link, a link spacing of the rotor hub 106, a hub spacing, etc.), the distance between the second point 212 and the fourth point 216 (e.g., a length of the second link 208), the distance between the fourth point 216 and the third point 214 (e.g., a length of the coupler link, a link spacing of the pitch housing 202, a pitch housing spacing, etc.), and the distance between the third point 214 and the first point 210 (e.g., a length of the first link 206). As discussed in further detail in reference to FIGS. 3A-5, the relative distances of the first point 210, the second point 212, the third point 214, and the fourth point 216 affect the kinematics of rotor 102, the response of the rotor 102 to control commands, as well as the magnitude of the moments and forces transferred to the rotor hub 106.

Figure 3A:
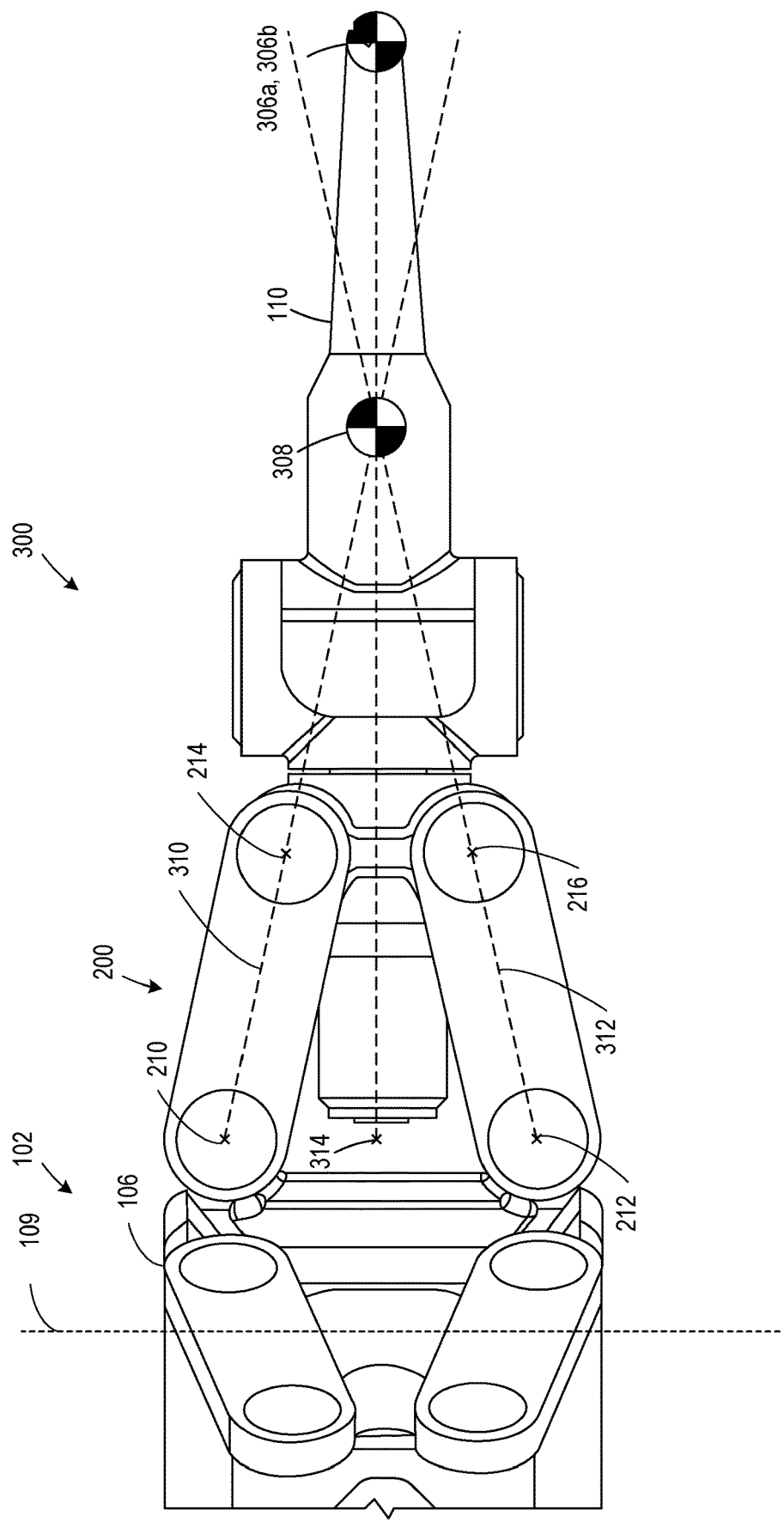
FIGS. 3A, 3B, and 3C illustrate the rotor of FIGS. 2A-2B as the four-bar linkage moves the rotor blade between an example neutral position, an example raised position, and an example lowered position.
Figure 3B:
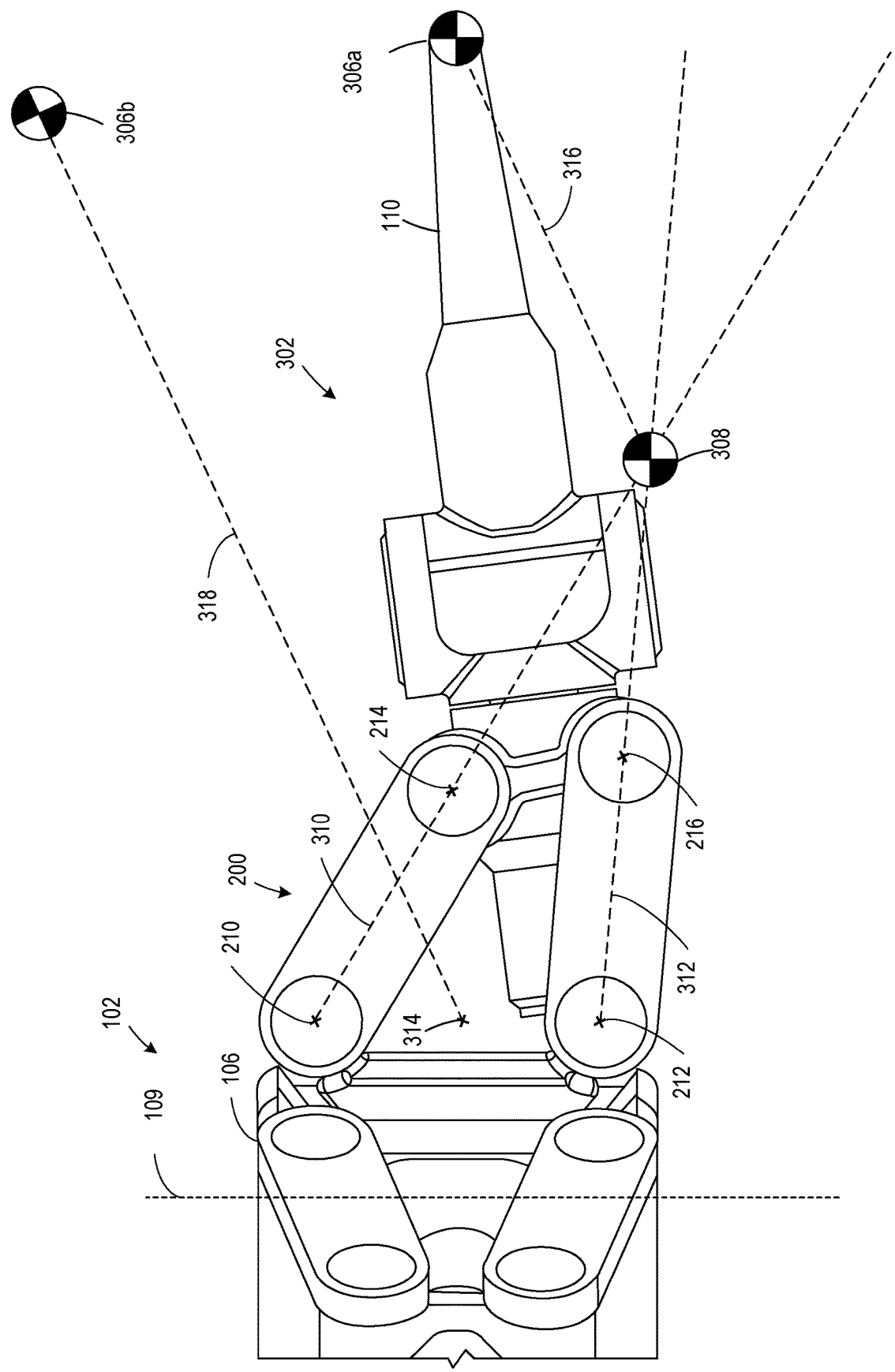
Figure 3C:
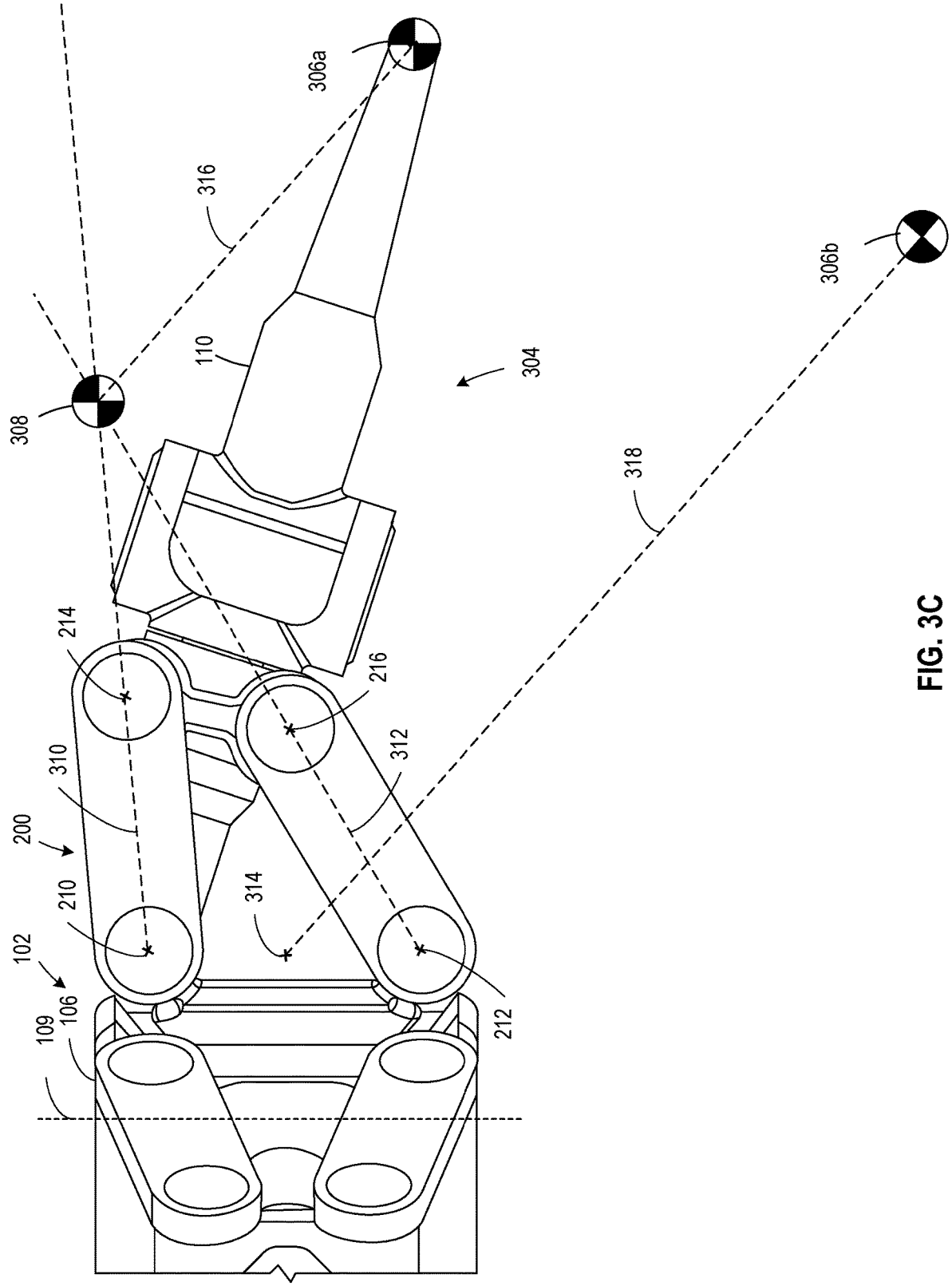

FIGS. 3A, 3B, and 3C illustrate the rotor 102 of FIG. 2A as the four-bar linkage 200 moves the rotor blade 110 between an example neutral position 300, an example raised position 302, and an example lowered position 304. The raised position 302 and lowered position 304 are examples of positions above and below the neutral position 300. The rotor blade 110 can move continuously between positions, and the raised position 302 and lowered position 304 can be different (e.g., higher or lower) in other examples. FIGS. 3A-3C demonstrate the movement of an example center of mass 306a of the rotor blade 110 about an example instant center of rotation 308 of the rotor blade 110. The instant center of rotation 308 can be determined by the intersection of an example first line 310 (containing first point 210 and third point 214) and an example second line 312 (containing second point 212 and fourth point 216). By way of comparison, FIGS. 3A-3C include a center of rotation 314 corresponding to a known flapping hinge and corresponding example center of mass 306b of the rotor blade 110. In this way, the motion of the centers of mass 306a, 306b can easily be compared at similar angular displacements (e.g., similar rotations) about the instant center of rotation 308 and the center of rotation 314. The centers of mass 306a, 306b are illustrative only and show approximately the same point of the rotor blade 110 as the rotor blade 110 rotates. The centers of mass 306a, 306b can have different locations on the rotor blade 110, depending on the full geometry of the rotor blade 110.

FIG. 3A illustrates the rotor 102 as the rotor blade 110 is in the neutral position 300. The positions of the centers of mass 306a, 306b are the same for the instant center of rotation 308 of the linkage 200 and the center of rotation 314 of the known flapping hinge. In other words, the centers of mass 306a, 306b are the same distance from the axis of rotation 109. Thus, the rotor blade 110 has the same rotational inertia for the linkage 200 and the known flapping hinge while in the neutral position 300.

FIG. 3B illustrates the rotor 102 as the rotor blade 110 is in the raised position 302. The instant center of rotation 308 has moved below the rotor blade 110, resulting in an example angular displacement 316 between the instant center of rotation 308 and the center of mass 306a. A similar example angular displacement 318 is shown between the center of rotation 314 of the known flapping hinge and the center of mass 306b. The angular displacements 316, 318 result from similar reaction forces to a control input (e.g., pitch command) given to the rotor blade 110. The angular displacements 316, 318 coincide with the centers of mass 306a, 306b moving closer to the axis of rotation 109. As such, the centers of mass 306a, 306b increase rotational velocity (e.g., rotate in the lead-lag direction) relative to the axis of rotation 109 to conserve rotational momentum. The center of mass 306b is closer to the axis of rotation 109 than the center of mass 306a. In other words, the radial displacement of the center of mass 306a is less than the radial displacement of the center of mass 306b. Thus, the change in rotational velocity and the resultant magnitude of lead-lag rotation is greater in rotors with known flapping hinges than the rotor 102 with the four-bar linkage 200. Similarly, the reduced lead-lag rotation induced by the four-bar linkage 200 results in a reduction of lead-lag vibrations that the rotor 102 would impart to the rotorcraft 100 (not shown).

FIG. 3C illustrates the rotor 102 as the rotor blade 110 is in the lowered position 304. The instant center of rotation 308 has moved above the rotor blade 110, resulting in the angular displacement 316 between the instant center of rotation 308 and the center of mass 306a. The corresponding angular displacement 318 between the center of rotation 314 of the known flapping hinge and the center of mass 306b is likewise shown. The center of mass 306b is closer to the axis of rotation 109 than the center of mass 306a. As described above in relation to FIG. 3B, the four-bar linkage 200 thus reduces lead-lag vibrations by limiting radial displacement of the center of mass 306a in both a positive and negative flap direction.

FIGS. 3A-3C further demonstrate that a total movement of the rotor blade 110, and correspondingly the center of mass 306a, can be reduced with a four-bar linkage 200 when compared to a known flapping hinge. This reduced movement reduces vibrations transferred from the rotor 102 to the rotorcraft 100. Additionally, the four-bar linkage 200 allows greater moments and forces to be transferred to the rotor 102 and the rotorcraft 100 as compared to a known flapping hinge. Thus, the rotor 102 allows the rotor blade 110 to move in the flap-wise direction with better response than a known fully articulated rotor. Further, the rotor 102, given the flap-wise degree of freedom, reduces stress transferred from the rotor blade 110 to the rotor hub 106 when compared to a known rigid rotor. Thus, the rotor 102 improves the response (e.g., agility) of the rotorcraft 100 while reducing the size and weight of the rotor hub 106 when compared to known flapping rotors (e.g., fully articulated rotors).

Figure 4:
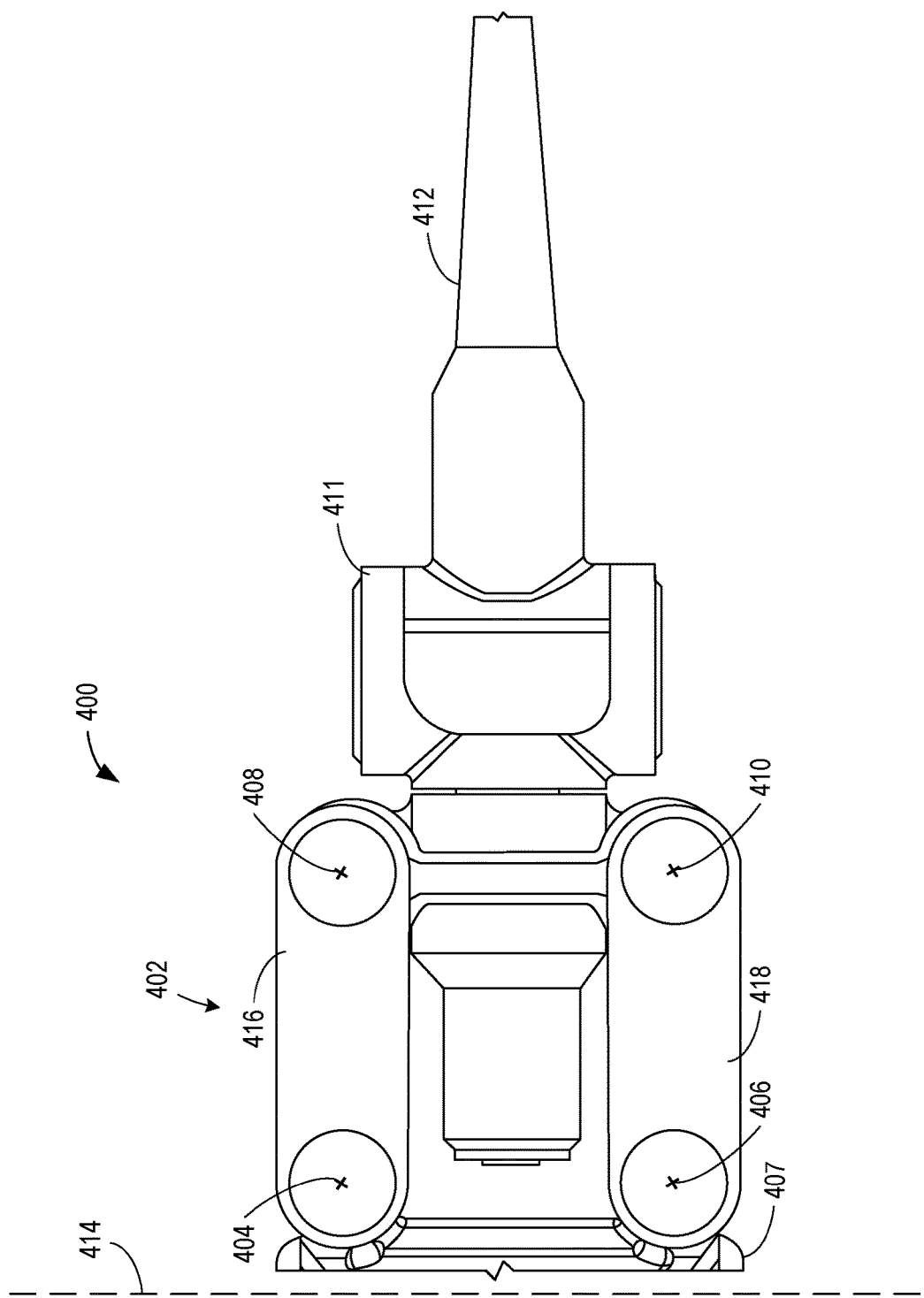
FIG. 4 is a side view of an example rotor with an example four-bar linkage where a hub spacing is equal to a pitch housing spacing.

FIG. 4 is a side view of an example rotor 400 with an example four-bar linkage 402 where a hub spacing (e.g., a distance between an example first point 404 and an example second point 406 on an example rotor hub 407) is equal to a pitch housing spacing (e.g., a distance between an example third point 408 and an example fourth point 410 on an example pitch housing 411). In this example, an example rotor blade 412 can translate relative to an example axis of rotation 414 as the four-bar linkage 402 rotates, but it does not rotate in the flap-wise direction (e.g., rotate in a plane containing the axis of rotation 414). When the rotor blade 412 experiences loading due to control commands, the rotor blade 412 translates resulting in a movement parallel to the axis of rotation 414 and a smaller movement perpendicularly to the axis of rotation 414. In this way, the reaction forces from control commands are split between translating the rotor blade 412 and bending the rotor blade 412. Translation of the rotor blade 412 parallel to the axis of rotation 414 reduces the radial movement of the rotor blade 412, which in turn reduces the lead-lag motion of the rotor blade 412 and the resultant lead-lag vibration. In addition to enabling translation of the rotor blade 412, the four-bar linkage 402 distributes flap-wise moments from the rotor blade 412 between an example first link 416 and an example second link 418, which reduces the amount of material and weight required in the rotor 400 while maintaining similar response (e.g., agility) as compared to known rigid rotors.

Figure 5:
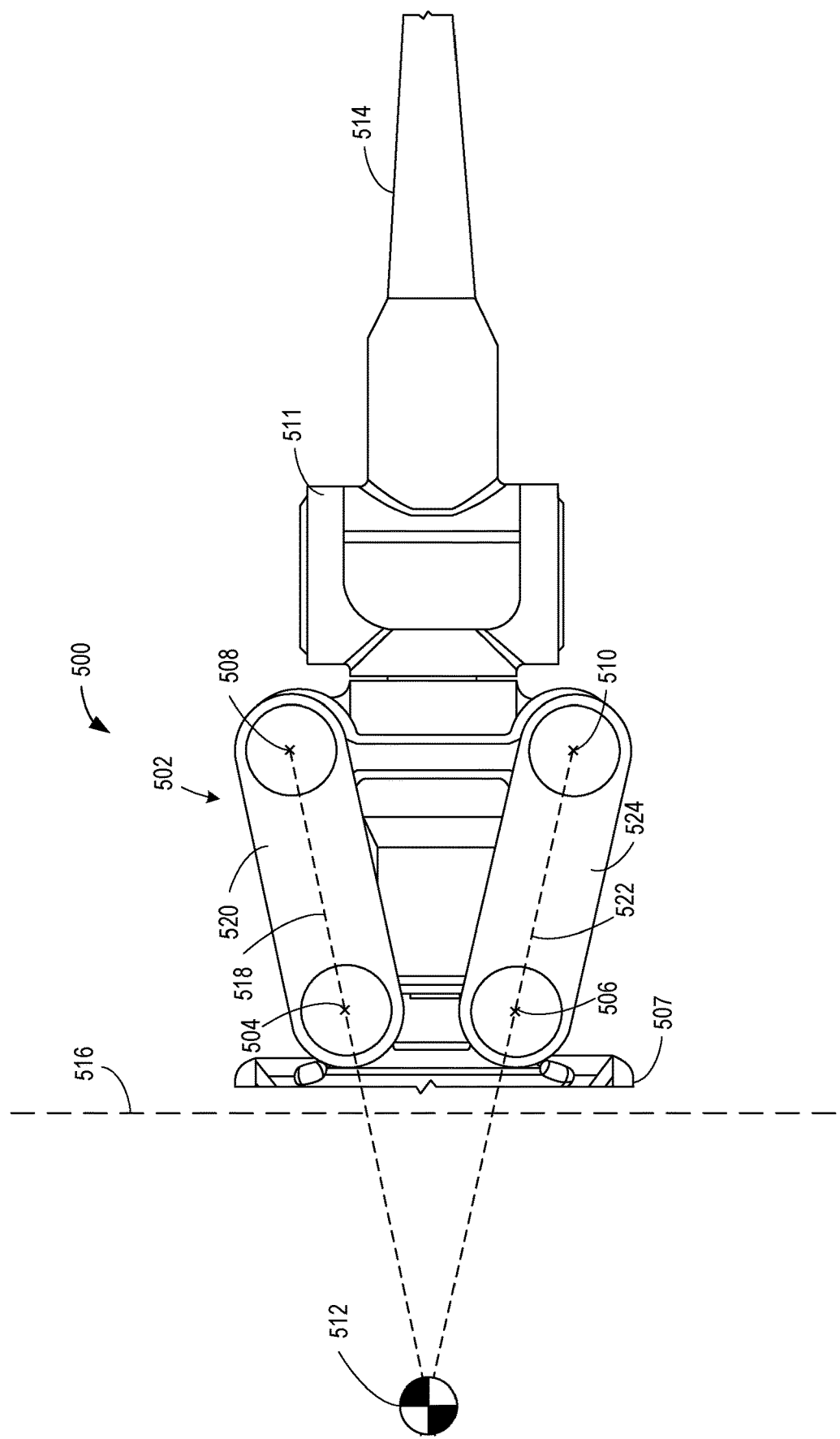
FIG. 5 is a side view of an example rotor with an example four-bar linkage where a hub spacing is smaller than a pitch housing spacing.

FIG. 5 is a side view of an example rotor 500 with an example four-bar linkage 502 where a hub spacing (e.g., a distance between an example first point 504 and an example second point 506, on an example rotor hub 507) is smaller than a pitch housing spacing (e.g., a distance between an example third point 508 and an example fourth point 510 on an example pitch housing 511). An example instant center of rotation 512 of an example rotor blade 514 is located opposite an example axis of rotation 516 from the rotor blade 514, creating a negative hinge offset for the rotor blade 514. The instant center of rotation 512 is determined by the intersection of an example first line 518 (the first line 518 including the first point 504 and the third point 508 of an example first link 520) and an example second line 522 (the second line 522 including the second point 506 and the fourth point 510 of an example second link 524). As the instant center of rotation 512 is further from the rotor blade 514 than a known flapping hinge center of rotation, the movement of the rotor blade 514 and the center of mass of the rotor blade 514 is amplified for a given angular displacement in the flap-wise direction when compared to a known flapping hinge. The negative hinge offset of the rotor blade 514 impacts the stability and dynamics of the rotor 500 based on how far away from the axis of rotation 516 the instant center of rotation 512 is located. Different example four-bar linkages 502 (e.g., with different relative positions of first point 504, second point 506, third point 508, and fourth point 510) have faster or slower responses corresponding to the distance between the instant center of rotation 512 and the axis of rotation 516.

Figure 6:
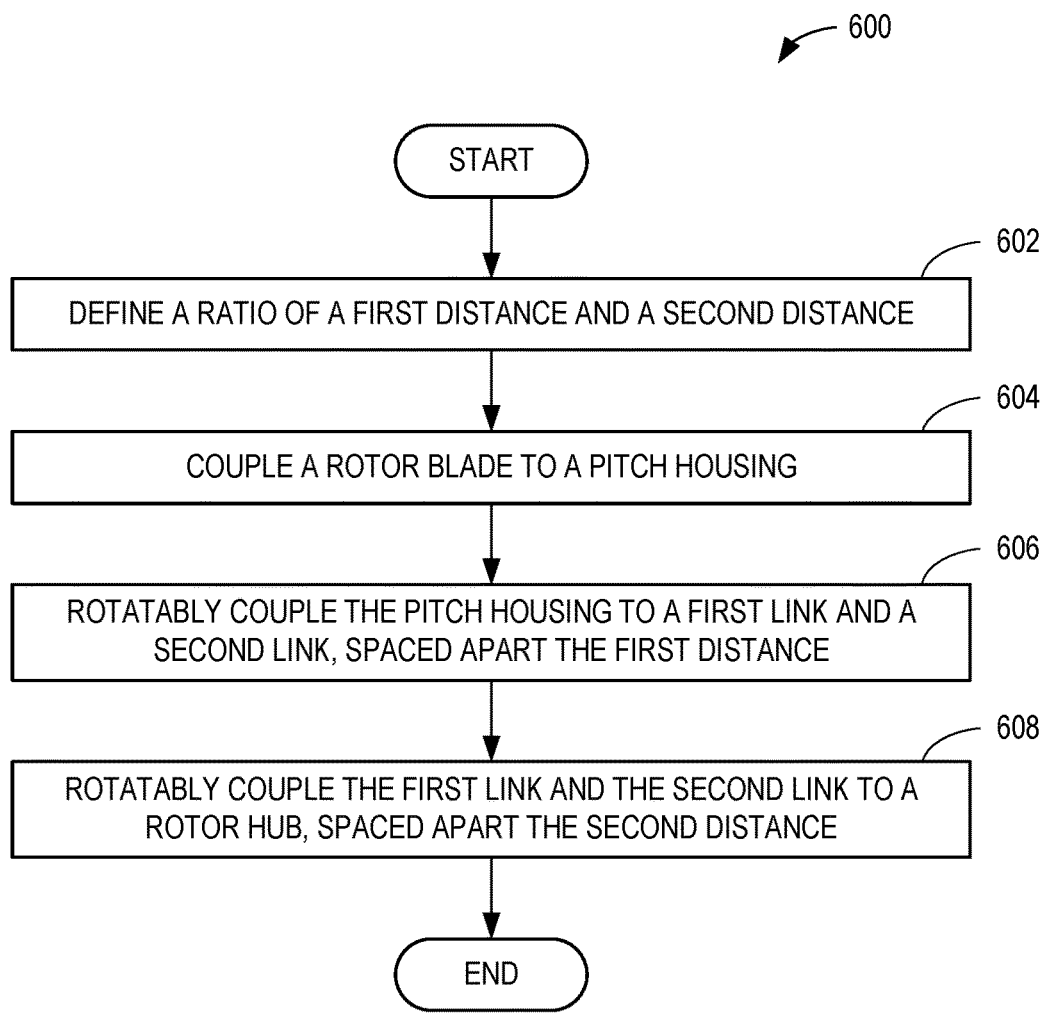
FIG. 6 is a flowchart describing an example method of forming a flapping rotor.

FIG. 6 is a flowchart describing an example method 600 of forming an example flapping rotor. The method 600 begins at block 602, at which a ratio of a first distance (e.g., a pitch housing spacing) and a second distance (e.g., a hub spacing) is defined. In this example, the first distance is defined by a distance between a connection point (e.g., third points 214, 408, 508) of a first link (e.g., first links 206, 416, 520) with a pitch housing (e.g., pitch housing 202, 411, 511) and a second connection point (e.g., fourth points 216, 410, 510) of a second link (e.g., second links 208, 418, 524) with the pitch housing. The second distance is defined by a distance between a connection point (e.g., first points 210, 404, 504) of the first link with a rotor hub (e.g., rotor hubs 106, 407, 507) and a second connection point (e.g., second points 212, 406, 506) of the second link with the rotor hub.

Thus, the ratio of the first distance to the second distance characterizes kinematics of an example four-bar linkage (e.g., linkages 200, 402, 502). An example ratio can be defined as less than one, meaning that the pitch housing spacing is less than (e.g., smaller than) the hub spacing, such as the four-bar linkage 200 described in relation to FIGS. 2A-3C. A ratio less than one corresponds to a rotor with greater agility than a known flapping rotor of similar size and weight. An example ratio can be defined as equal to one, meaning that the pitch housing spacing is equal to the hub spacing, such as the four-bar linkage 402 described in relation to FIG. 4. A ratio of one corresponds to a rotor with similar agility to a known rigid rotor. An example ratio can be defined as greater than one, meaning that pitch housing spacing is greater than (e.g., larger than) the hub spacing, such as the four-bar linkage 502 described in relation to FIG. 5. A ratio greater than one places an instant center of rotation (e.g., the instant center of rotation 512) on an inboard side of the four-bar linkage. In some examples, the ratio greater than one corresponds to an instant center of rotation that is between an axis of rotation of the hub and the four-bar linkage, which results in a rotor with less agility than a known rotor with known flapping rotor hubs. In some examples, the ratio greater than one corresponds to the instant center of rotation located on or near the axis of rotation of the hub, which produces rotor dynamics similar to a known teetering hub. In other examples, the ratio greater than one corresponds to the instant center of rotation that is located opposite the four-bar linkage relative to the axis of rotation of the hub, as shown in FIG. 5. When the instant center of rotation is located opposite the four-bar linkage from the axis of rotation, the four-bar linkage creates a negative hinge offset that alters rotor stability and dynamics. Thus, by defining the ratio of the first distance and the second distance, the agility of the rotor including the example flapping rotor hub is likewise defined.

The example method 600 continues to block 604, where a rotor blade (e.g., rotor blades 110, 412, 514) is coupled to the pitch housing. In some examples, the rotor blade is rotationally coupled to the pitch housing to allow for rotation in the lead-lag direction (e.g., rotation in a plane substantially perpendicular to an axis of rotation of the rotor hub). The motion of rotor blade is otherwise controlled by the motion of the pitch housing. The method 600 continues to block 606 where the pitch housing is rotatably coupled to the first link and the second link, spaced apart at the first distance. The first link is coupled to the first connection point of the pitch housing and the second link is coupled to the second connection point of the pitch housing. The method 600 continues to block 608 where the first link and the second link are rotatably coupled to the rotor hub, spaced apart at the second distance. The first link is coupled to the first connection point of the rotor hub and the second link is coupled to the second connection point of the rotor hub. Thus, a flapping rotor hub is formed with a ratio equal to the ratio defined in block 602, and the method 600 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, a., region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately", "substantially", and "about" modify their subjects/values to recognize the potential presence of variations that occur in real world applications. For example, "approximately", "substantially", and "about" may modify dimensions that may not be exact due to manufacturing tolerances and/or other real world imperfections as will be understood by persons of ordinary skill in the art. For example, "approximately", "substantially", and "about" may indicate such dimensions may be within a tolerance range of +/−10% or +/−3° unless otherwise specified herein.

As used herein, the terms "response" and "agility" refer to a speed and/or accuracy with which a rotorcraft changes attitude and/or velocity in response to a control command (e.g., a rotor pitch command, a movement of a swashplate, etc.). In other words, the terms "response" and "agility" refer to how efficiently a rotor blade transfers reaction forces resulting from a change in rotor blade pitch to a body of the rotor craft. Thus, a good (e.g., a quick) response results in an efficient transfer of reaction forces to the body of the rotorcraft, which is also described as good (e.g., high) agility. In contrast, a poor (e.g., slow) response results in an inefficient transfer of reaction forces to the body of the rotorcraft, which is also described as poor (e.g., low) agility.

Example methods, apparatus, systems, and articles of manufacture of flapping four-bar rotors for aircraft are disclosed herein. Further examples and combinations thereof include the following: Example 1 includes a flapping rotor hub comprising a rotor hub having a first end and a second end, the first end opposite the second end along an axis of rotation of the rotor hub, a first link rotatably coupled to the rotor hub at the first end, the first link to rotate in a plane parallel to the axis of rotation, a second link rotatably coupled to the rotor hub at the second end, the second link to rotate in the plane, and a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade.

Example 2 includes the rotor hub of example 1, wherein a distance between the third end and the fourth end is greater than a distance between the first end and the second end.

Example 3 includes the rotor hub of example 1, wherein a distance between the third end and the fourth end is less than a distance between the first end and the second end.

Example 4 includes the rotor hub of example 1, wherein a distance between the third end and the fourth end is equal to a distance between the first end and the second end.

Example 5 includes the rotor hub of example 1, wherein a distance between the first end and the third end is larger than a distance between the second end and the fourth end.

Example 6 includes the rotor hub of example 1, wherein a distance between the first end and the third end is smaller than a distance between the second end and the fourth end.

Example 7 includes the rotor hub of example 1, wherein a distance between the first end and the third end is equal to a distance between the second end and the fourth end.

Example 8 includes the rotor hub of example 1, wherein the rotor blade is rotatably coupled to the pitch housing, the rotor blade to rotate in a lead-lag direction.

Example 9 includes the rotor hub of example 1, wherein the first link and the second link are coupled to a first side of the pitch housing and the rotor hub further includes a third link and a fourth link, the third link and the fourth link rotationally coupled to a second side of the pitch housing and the rotor hub, the third link parallel to the first link, the third link sharing a first axis of rotation at the rotor hub and a second axis of rotation at the pitch housing with the first link, the fourth link parallel to the second link, the fourth link sharing a third axis of rotation at the rotor hub and a fourth axis of rotation at the pitch housing with the second link.

Example 10 includes the rotor hub of example 1, wherein the first link, the second link, and the pitch housing form a first blade assembly, and the rotor hub includes a second blade assembly, the first blade assembly identical to the second blade assembly, the second blade assembly radially symmetrically coupled to the rotor hub about the axis of rotation relative to the first blade assembly.

Example 11 includes the rotor hub of example 1, wherein the first link, the second link, rotor hub, and the pitch housing form a four-bar linkage, the four-bar linkage dimensioned to cause a center of mass of the rotor blade to move in a substantially axial direction.

Example 12 includes a rotorcraft comprising a mast having an axis of rotation, a hub coupled to the mast, a rotor blade coupled to the hub and substantially perpendicular to the axis of rotation, and a four-bar linkage coupled to the hub and the rotor blade. The four-bar linkage includes a ground link fixedly coupled to the hub, the ground link having a first end spaced from a second end, the first end and the second end to form a line parallel to the axis of rotation, a first link rotatably coupled to the ground link at the first end, the first link to rotate in a plane parallel to the axis of rotation, a second link rotatably coupled to the ground link at the second end, the second link to rotate in the plane. The rotorcraft further includes a pitch housing having a third end spaced from a fourth end, the pitch housing rotatably coupled to the first link at the third end, the pitch housing rotatably coupled to the second link at the fourth end, the pitch housing to move along the plane, the pitch housing coupled to the rotor blade.

Example 13 includes the rotorcraft of example 12, wherein a distance between the first end and the second end is equal to a distance between the third end and the fourth end.

Example 14 includes the rotorcraft of example 12, wherein a distance between the first end and the second end is less than a distance between the third end and the fourth end.

Example 15 includes the rotorcraft of example 12, wherein a distance between the first end and the second end is greater than a distance between the third end and the fourth end.

Example 16 includes the rotorcraft of example 12, wherein the four-bar linkage is dimensioned to maintain the rotor blade substantially perpendicular to the axis of rotation as the rotor blade rotates about the axis of rotation.

Example 17 includes a method of forming a flapping rotor, the method comprising coupling a rotor blade to a pitch housing, rotatably coupling the pitch housing to a first link and a second link, the first link coupled to the pitch housing spaced apart from the second link a first distance, rotatably coupling the first link and the second link to a rotor hub, the first link coupled to the rotor hub spaced apart from the second link a second distance, and defining a ratio of the first distance and the second distance, the ratio corresponding to an agility the rotor provides to a rotorcraft.

Example 18 includes the method of example 17, wherein the ratio is one.

Example 19 includes the method of example 17, wherein the ratio is greater than one.

Example 20 includes the method of example 17, wherein the ratio is less than one.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A flapping rotor hub comprising:
   a rotor hub having a first end and a second end, the first end opposite the second end along an axis of rotation of the rotor hub;
   a first link rotatably coupled to the rotor hub at the first end, the first link to rotate in a plane parallel to the axis of rotation;
   a second link rotatably coupled to the rotor hub at the second end, the second link to rotate in the plane; and
   a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein a distance between the third end and the fourth end is less than a distance between the first end and the second end.

2. The flapping rotor hub of claim 1, wherein the first link, the second link, and the pitch housing form a first blade assembly, and the rotor hub includes a second blade assembly, the first blade assembly identical to the second blade assembly, the second blade assembly radially symmetrically coupled to the rotor hub about the axis of rotation relative to the first blade assembly.

3. The flapping rotor hub of claim 1, wherein the pitch housing includes a lead-lag hinge, the lead-lag hinge to facilitate lead-lag rotation of the rotor blade.

4. The flapping rotor hub of claim 1, wherein a first length of the first link is different than a second length of the second link.

5. A flapping rotor hub comprising:
   a rotor hub having a first end and a second end, the first end opposite the second end along an axis of rotation of the rotor hub;
   a first link rotatably coupled to the rotor hub at the first end, the first link to rotate in a plane parallel to the axis of rotation;
   a second link rotatably coupled to the rotor hub at the second end, the second link to rotate in the plane; and
   a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein a distance between the first end and the third end is larger than a distance between the second end and the fourth end.

6. The flapping rotor hub of claim 5, wherein the pitch housing includes a lead-lag hinge, the lead-lag hinge to facilitate lead-lag rotation of the rotor blade.

7. The flapping rotor hub of claim 5, wherein the first link, the second link, and the pitch housing form a first blade assembly, and the rotor hub includes a second blade assembly, the first blade assembly identical to the second blade assembly, the second blade assembly radially symmetrically coupled to the rotor hub about the axis of rotation relative to the first blade assembly.

8. A flapping rotor hub comprising:
a rotor hub having a first end and a second end, the first end opposite the second end along an axis of rotation of the rotor hub;
a first link rotatably coupled to the rotor hub at the first end, the first link to rotate in a plane parallel to the axis of rotation;
a second link rotatably coupled to the rotor hub at the second end, the second link to rotate in the plane; and
a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein a distance between the first end and the third end is smaller than a distance between the second end and the fourth end.

9. The flapping rotor hub of claim 8, wherein the pitch housing includes a lead-lag hinge, the lead-lag hinge to facilitate lead-lag rotation of the rotor blade.

10. The flapping rotor hub of claim 8, wherein the first link, the second link, and the pitch housing form a first blade assembly, and the rotor hub includes a second blade assembly, the first blade assembly identical to the second blade assembly, the second blade assembly radially symmetrically coupled to the rotor hub about the axis of rotation relative to the first blade assembly.

11. A flapping rotor hub comprising:
a rotor hub having a first end and a second end, the first end opposite the second end along an axis of rotation of the rotor hub;
a first link rotatably coupled to the rotor hub at the first end, the first link to rotate in a plane parallel to the axis of rotation;
a second link rotatably coupled to the rotor hub at the second end, the second link to rotate in the plane; and
a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein the rotor blade is rotatably coupled to the pitch housing, the rotor blade to rotate in a lead-lag direction.

12. The flapping rotor hub of claim 11, wherein the pitch housing includes a lead-lag hinge, the lead-lag hinge to facilitate the rotor blade to rotate in the lead-lag direction.

13. The flapping rotor hub of claim 11, wherein a first length of the first link is different than a second length of the second link.

14. A flapping rotor hub comprising:
a rotor hub having a first end and a second end, the first end opposite the second end along an axis of rotation of the rotor hub;
a first link rotatably coupled to the rotor hub at the first end, the first link to rotate in a plane parallel to the axis of rotation;
a second link rotatably coupled to the rotor hub at the second end, the second link to rotate in the plane; and
a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein the first link and the second link are coupled to a first side of the pitch housing and the rotor hub further includes a third link and a fourth link, the third link and the fourth link rotationally coupled to a second side of the pitch housing and the rotor hub, the third link parallel to the first link, the third link sharing a first axis of rotation at the rotor hub and a second axis of rotation at the pitch housing with the first link, the fourth link parallel to the second link, the fourth link sharing a third axis of rotation at the rotor hub and a fourth axis of rotation at the pitch housing with the second link.

15. The flapping rotor hub of claim 14, wherein the pitch housing includes a lead-lag hinge, the lead-lag hinge to facilitate lead-lag rotation of the rotor blade.

16. The flapping rotor hub of claim 14, wherein a first length of the first link is different than a second length of the second link.

17. A flapping rotor hub comprising:
a rotor hub having a first end and a second end, the first end opposite the second end along an axis of rotation of the rotor hub;
a first link rotatably coupled to the rotor hub at the first end, the first link to rotate in a plane parallel to the axis of rotation;
a second link rotatably coupled to the rotor hub at the second end, the second link to rotate in the plane; and
a pitch housing rotatably coupled to the first link at a third end of the pitch housing, the pitch housing rotatably coupled to the second link at a fourth end of the pitch housing, the third end different than the fourth end, the pitch housing to rotate and translate in the plane, the pitch housing to receive a rotor blade, wherein the first link, the second link, the rotor hub, and the pitch housing form a four-bar linkage, the four-bar linkage dimensioned to cause a center of mass of the rotor blade to move in a substantially axial direction.

18. The flapping rotor hub of claim 17, wherein a distance between the first end and the third end is equal to a distance between the second end and the fourth end.

19. The flapping rotor hub of claim 17, wherein the pitch housing includes a lead-lag hinge, the lead-lag hinge to facilitate lead-lag rotation of the rotor blade.

20. The flapping rotor hub of claim 17, wherein a first length of the first link is different than a second length of the second link.

* * * * *